Feb. 2, 1926.                         1,571,260
E. GAIRING
BORING TOOL
Filed Dec. 6, 1923
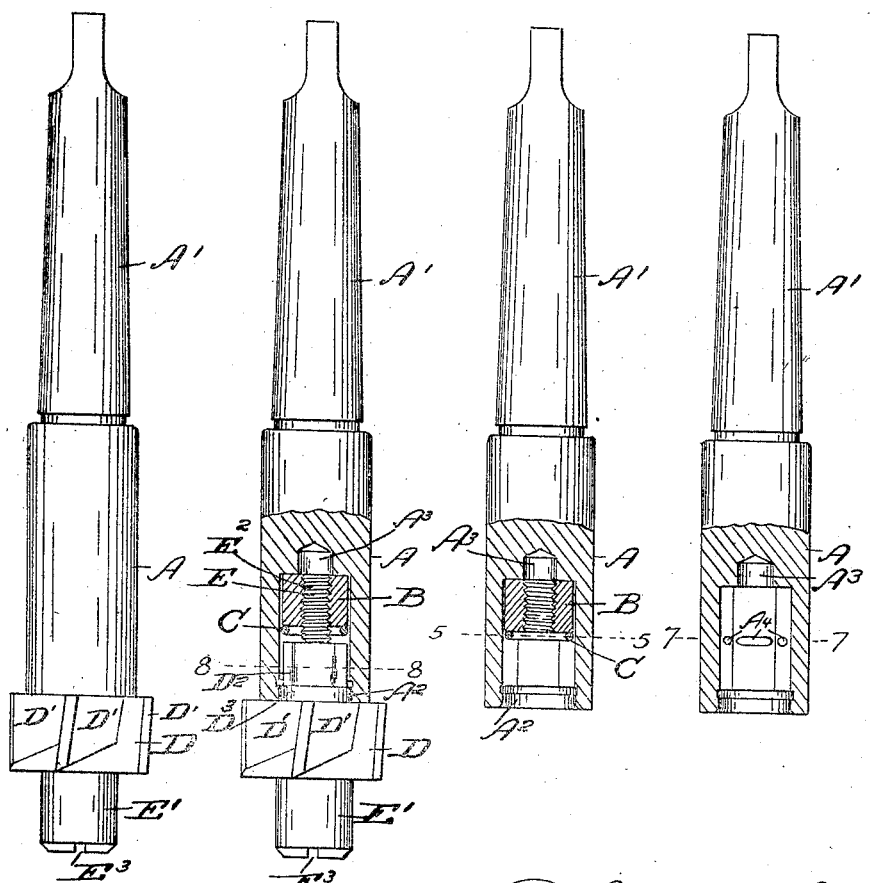
Inventor
Emil Gairing
By J. E. Thomas
Attorney Patented Feb. 2, 1926.

1,571,260

UNITED STATES PATENT OFFICE.

EMIL GAIRING, OF DETROIT, MICHIGAN.

BORING TOOL.

Application filed December 6, 1923. Serial No. 678,844.

*To all whom it may concern:*

Be it known that I, EMIL GAIRING, citizen of the United States, residing at Detroit, county of Wayne, State of Michigan, have invented a certain new and useful Improvement in Boring Tools, and declare the following to be a full, clear, and exact description of the same, such as will enable others skilled in the art to which it pertains to make and use the same, reference being had to the accompanying drawings, which form a part of this specification.

My invention relates to boring and counterboring tools shown in the accompanying drawings and more particularly described in the following specification and claims.

One object of the present invention is to provide a simple and inexpensive tool fitted with a positive "driving lock" between the shank of the tool and the holder.

A further object of the invention is to provide means for securely locking the tool in the holder adapted to accommodate itself to the wear of the tool that it may be positively locked in the holder irrespective of the wear of the cutting tool.

A further object of the invention is to provide means for securing a nut in the shank of the holder to receive the threaded end of the pilot rod whereby the cutting tool is held in the holder against dislodgement.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a side elevation of the device.

Figure 2 is a sectional elevation taken on or about line 2—2 of Figure 8.

Figure 3 is a sectional elevation with the cutting tool and pilot rod removed showing a nut, in which the threaded end of the pilot rod is screwed, held in the holder by an expansion ring lodged in a peripheral groove in the holder and overlapping the corners of the nut.

Figure 4 is a sectional elevation of the holder with the nut and ring shown in the preceeding figure removed to disclose the peripheral grooves in which the expansion ring for retaining the nut is lodged.

Figure 5 is an enlarged cross-sectional view through the holder taken on or about line 5—5 of Figure 3, showing the expansion ring which overlaps the corners of the nut lodged in the walls of the socket holder to retain the nut therein.

Figure 6 is an end elevation of the holder, nut and ring, as indicated in Figure 3.

Figure 7 is a cross-sectional view taken on or about line 7—7 of Figure 4, showing the peripheral groove in which the expansion ring is lodged for holding the nut in place.

Figure 8 is a cross-sectional view taken on or about line 8—8 of Figure 2 showing the driving relation between the tool and the holder due to the hexagonal shape of the shank of the cutting tool and the complementary shaped socket of the holder to which it is fitted.

Referring now to the letters of reference placed upon the drawings:

A is a socket holder for a cutting tool having a tapering shank $A^1$ adapted for insertion in a suitable chuck or other driving means, not shown. The interior walls of the socket portion of the holder are hexagonal in cross section to receive and embrace a hexagonal nut B, secured against displacement by an expansion ring C lodged in a peripheral groove $A^4$ in the wall of the socket and overlapping the corners of the nut to secure the latter against displacement.

D is a cutting tool having a plurality of cutting flutes $D^1$ and a relatively short integral shank $D^2$ hexagonal in cross-section for a portion of its length to fit the hexagonal walls of the tool holder.

The cutting end of the tool is bored to receive a pilot rod E extending through the same and having an enlarged integral head $E^1$ overlapping the tool and threaded as at $E^2$ to engage the nut B.

I have referred to the inner walls of the socket portion as hexagonal in cross-section.

It will be obvious however that the socket portion may be formed with one or more flat sides to receive a correspondingly shaped nut and shank of the cutting tool; the tool being thus held against rotation in the tool holder:—the flat faces serving as the driving connection between the holder and the tool.

Extending from the socket of the holder is a recess $A^3$ to receive the end of the pilot rod when the latter is adjusted to take up the wear of the cutting tool. The enlarged head $E^1$ of the pilot rod is provided with a kerf $E^3$ to receive a screw driver whereby it may be adjusted.

Having now indicated the several parts by reference letters the construction and operation of the device will be readily understood.

The co-acting flat faces of the respective elements provides an effective and positive driving connection between the tool and the holder,—while the overhanging head of the adjustable pilot rod serves not only to center the tool but secures it against dislodgement from the socket or sleeve of the holder.

It will also be seen that should the pilot rod break, the nut and pilot rod may be removed upon the withdrawal of the expansion ring C engaging the nut;—the nut and pilot rod may then be replaced with new parts at a relatively small cost.

The shank of the cutting tool D is provided with a finished rounded cylindrical portion $D^3$ between the upper edge of the cutting tools and the hexagonal portion of its stem which co-ordinates with a like cylindrical portion $A^2$ adjacent the margin of the tool socket to insure precision in centralizing the cutting tool with the axis of the socket portion thereby insuring accuracy in production.

Having thus described my invention what I claim is:

In a device of the character described, a tool holder provided with a socket hexagonal in cross-section throughout the greater portion of its length and having a short cylindrical portion at its outer end, said socket also having a circumferential groove in its flat inner walls formed by sections varying in depth from the angles of the said walls where the sections of the groove terminate, a nut within the hexagonal portion of the socket, an expansion ring engaging the sections of the groove in the socket and exposed at the angles of the same to overlap the outer corners of the nut and secure the same from dislodgement, a cutter head having a central bore and provided with a shank extending into the hexagonal portion of the socket and conforming to the configuration of the same, the said ring being located between the nut and the shank of the cutter and the cutter head having a short cylindrical portion between the hexagonal shank and the head cooperating with the short outer cylindrical portion of the socket whereby precision in centering the cutter head is insured, and a threaded pilot rod having an enlarged head, the threaded portion extending through the cutter head and into said nut, whereby the enlarged head engages the cutter head to hold the same in position.

In testimony whereof, I sign this specification.

EMIL GAIRING.